United States Patent [19]

Rojey

[11] 4,350,020

[45] Sep. 21, 1982

[54] PROCESS FOR PRODUCING HEAT BY MEANS OF A HEAT PUMP OPERATED WITH A FLUID MIXTURE AS WORKING AGENT AND AIR AS HEAT SOURCE

[75] Inventor: Alexandre Rojey, Garches, France

[73] Assignee: Institut Francais du Petrole, Rueil-Malmaison, France

[21] Appl. No.: 227,844

[22] Filed: Jan. 23, 1981

[30] Foreign Application Priority Data

Jan. 24, 1980 [FR] France .................................. 80 1575

[51] Int. Cl.³ ............................................. F17D 17/06
[52] U.S. Cl. ........................................... 62/93; 62/114
[58] Field of Search ........................... 62/93, 114, 272

[56] References Cited

U.S. PATENT DOCUMENTS 3,851,822 12/1974 Pocruja et al. ......................... 62/93
4,089,186 5/1978 Rojey et al. ........................... 62/114

Primary Examiner—Ronald C. Capossela
Attorney, Agent, or Firm—Millen & White

[57] ABSTRACT

A heat pump whose working fluid, circulating through a closed loop comprising an evaporation zone, a compression zone, a condensation zone, and an expansion zone, consists of a non-azeotropic mixture of at least two separate fluids, said working fluid being in countercurrent heat-exchange contact with a first external fluid used as heat source, and with a second external fluid used as heating fluid.

13 Claims, 6 Drawing Figures

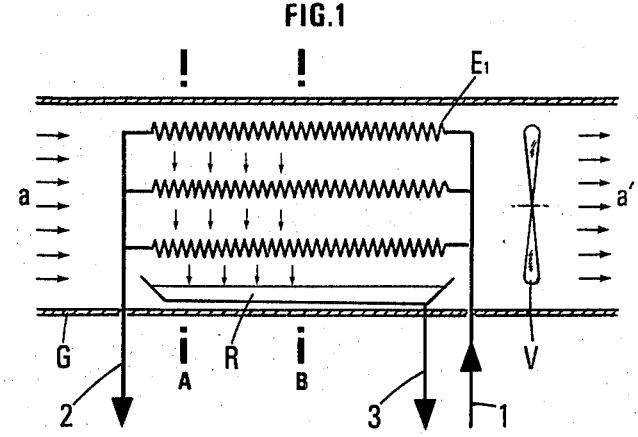
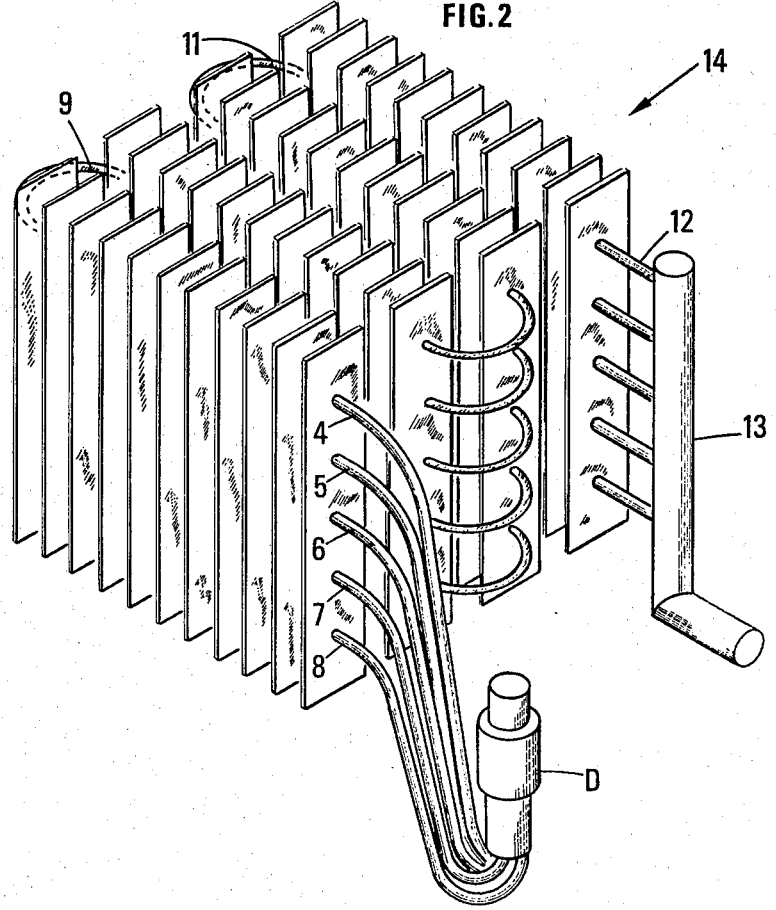

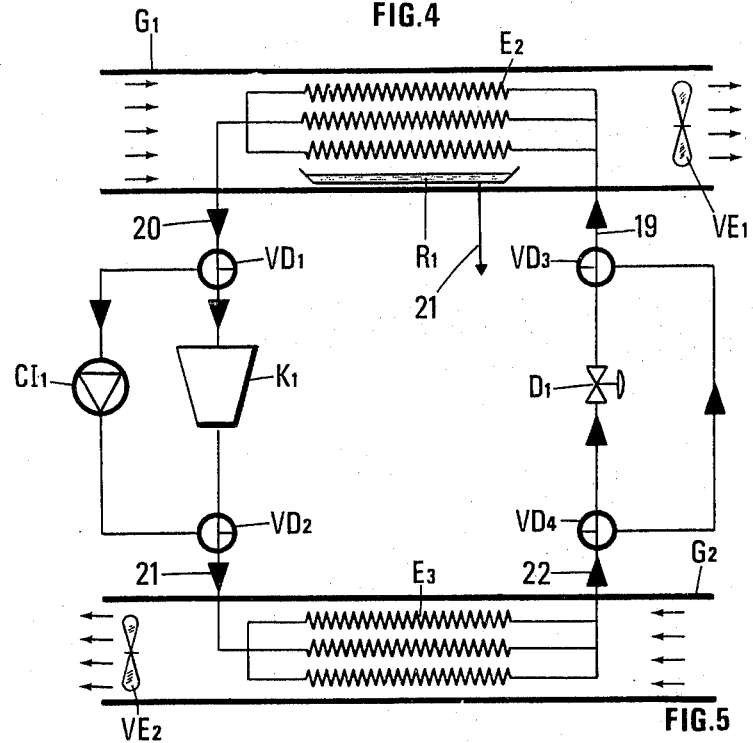
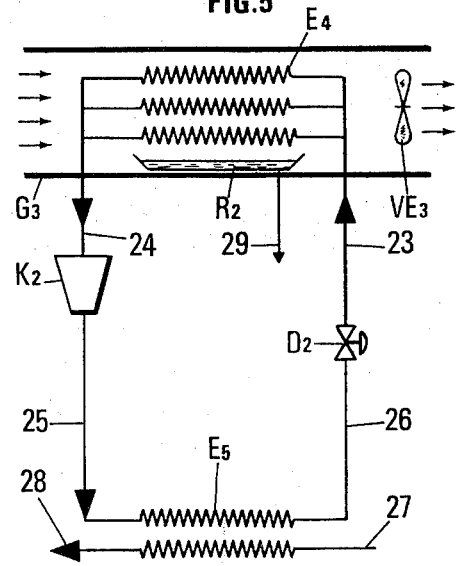
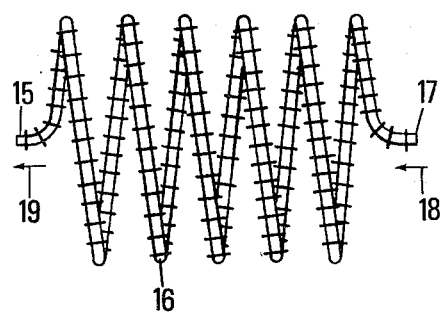

PROCESS FOR PRODUCING HEAT BY MEANS OF A HEAT PUMP OPERATED WITH A FLUID MIXTURE AS WORKING AGENT AND AIR AS HEAT SOURCE

BACKGROUND OF THE INVENTION

This invention concerns the field of heat pumps operated with a mixture of working fluids.

The use of working fluids as a mixture, in heat pumps, so as to take heat within a temperature range, and wherein the mixture used in the heat pump is progressively vaporized, in a first heat exchange zone, wherein its temperature is increased with the temperature of an external fluid used as heat source being decreased during said exchange, so as to supply heat within a temperature range, the mixture used in the heat pump being progressively condensed in a second heat exchange zone, wherein its temperature decreases simultaneous with an increase in the temperature of an external fluid to which said heat is transferred. Such process is described in U.S. Pat. No. 4,089,186.

Such a technique provides for a large improvement in the performance coefficient of the heat pumps whenever the temperature of the external fluids with which are the heat exchanges performed varies during said exchanges, and may be used both for industrial applications and house heating.

The use of the working fluid in a heat pump for house heating is of particular interest, and is well adapted to the use of heat pumps operated with mixtures inasmuch as the heats exchanged are always, in this case, at least partly sensible heats and the heat exchanges involve temperature variations of the external fluids with which the exchanges are performed.

The applications which have been described in the U.S. Pat. No. 4,089,186 concern the cases where heat is recovered within a wide temperature range. For this reason, there was described in U.S. Pat. No. 4,089,186, a preferred embodiment consisting of condensing the mixture circulating in a heat pump in two stages, so as to supply heat in a narrower temperature range than the temperature range in which heat is recovered.

On the other hand, water is the only heat source mentioned in the U.S. Pat. No. 4,089,186. As a matter of fact, it is relatively simple to adapt the use of mixtures to heat pump operated with water as external fluid at the evaporator and at the condenser. It is necessary, in the case of a heat pump operated with a fluid mixture, in order to obtain the performance advantages resulting from the use of a mixture, to operate the evaporator and the condenser in a counter-current exchange mode. When these heat exchanges are performed with water, many present day exchangers are adapted to such an exchange mode, and are already operating in such conditions in the case of a single fluid; this is the case, for example, of double-tube exchangers as well as plate exchangers.

On the other hand, when the heat source fluid is air, the evaporator generally operates according to a cross-current heat-exchange mode. The working fluid circulates through tubes having with fins arranged in sheets wherethrough the air is circulated perpendicular to the sheets by means of a fan.

Since it is impossible to recover heat from a water stream under conditions at which water is likely to freeze, the vaporization of the mixture is performed according to the teachings of U.S. Pat. No. 4,089,186, within a temperature range from 0° to 100° C.

In the case of heat pumps operated with air as heat source, when the air contains water vapor, the operation of the evaporator at low temperature produces condensation and frosting of the water contained in the air. This feature results in severe limitations of the conditions under which heat pumps using air as a heat source, when no defrosting device provided for can be used. With the provision of a defrosting device, the efficiency of the heat pump is necessarily decreased.

In the case of a heat pump operated with a single working fluid, the temperature of the evaporating working fluid is substantially uniform, and as soon as the temperature of the air decreases by a few degrees to below 0° C., the water contained in the wet air which is blown onto the evaporator surfaces, condenses and freezes over the surface of the tubes.

SUMMARY OF THE INVENTION

It has been discovered, in contrast to what happens according to U.S. Pat. No. 4,089,186, that the use of a mixture may be advantageous when the heat source is air and in particular, under conditions where frost is likely to be formed, i.e., when the working fluid is completely or partly vaporized at a temperature below 0° C., during at least a fraction of the total operating period.

BRIEF DESCRIPTION OF THE DRAWINGS

FIG. 1 is a schematic diagram illustrating the basic flow-pattern according to the invention;

FIG. 2 is a perspective view of a preferred arrangement of the evaporator of the invention having tubes having heat exchange surfaces;

FIG. 3 is a side view of an arrangement of tubes employed in the condenser of the system;

FIG. 4 is a schematic diagram showing one heat pump arrangement according to the invention for recovering heat from a building;

FIG. 5 is a schematic diagram showing another heat pump arrangement according to the invention for recovering heat from outside air.

DETAILED DISCUSSION

Figure 6:
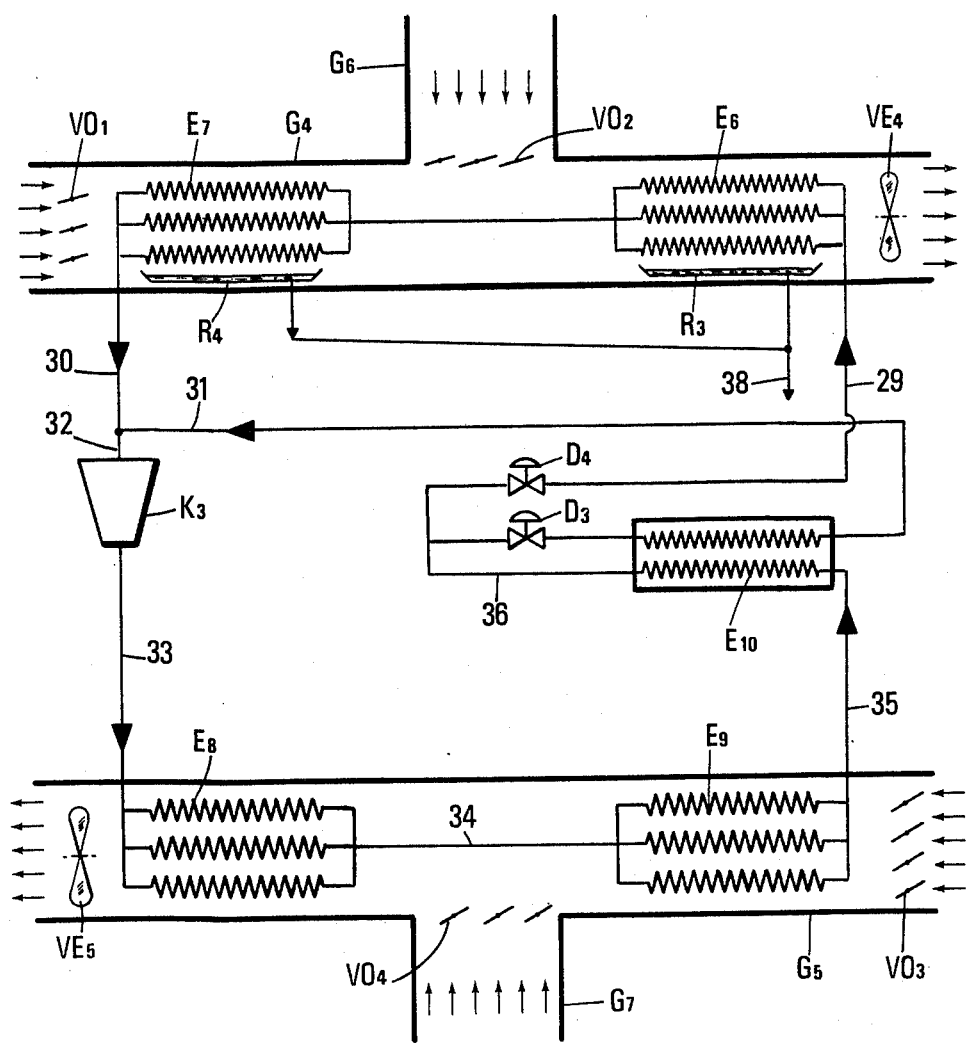
FIG. 6 is a schematic diagram showing still another heat pump arrangement according to the invention for recovering heat from both air withdrawn from a building and from external air.

The arrangement according to the invention consists of operating according to the basic flow diagram shown in FIG. 1. The working fluid mixture is fed through line 1, circulates in the enclosure E1, counter-currently with the air stream (circulating in the direction from a to a' within the circulation casing G) sucked by the ventilator V, and is discharged through duct 2. The mixture circulates through the tubes or between the plates defining a confined space and forming the heat exchange enclosure $E_1$ having a heat exchange surface with external air. The thermal transfer coefficient is much lower on the air side than on the mixture side, therefore, said exchange surface is preferably provided with fins and-/or pins.

When the wet air contacts the heat exchange surface, it cools down progressively and when its temperature becomes equal, as an average or locally, to the dew point temperature (section A on the diagram of FIG. 1), and water begins to condense. This condensation water is discharged as it condenses. For this reason a preferred arrangement is an arrangement where the mixture and the air circulate along a horizontal axis, the water flowing by gravity along the exchange surfaces and being collected in a receiver R wherefrom it is discharged through duct 3. It is absolutely necessary to prevent the condensed water from flowing towards the coldest zones of the evaporator, i.e. towards the mixture inlet and a vertical arrangement, wherein the mixture is supplied from the bottom and the condensed water flows downwardly over the exchange surface to the bottom thereof, must be avoided. However, vertical arrangement wherein the mixture is supplied at the top and air at the bottom is less disadvantageous. Nonetheless, such a vertical arrangement is less favorable than the horizontal arrangement because the water stream is in contact with the air at a higher temperature and, accordingly, the air becomes saturated with water, thereby resulting in an increased amount of water vapor carried away and in increased frosting.

The condensed water is progressively recovered from section A to section B where the temperature decreases, as an average or locally, below 0° C. Beyond section B frosting occurs and little or no water is recovered.

However, the amount of deposited frost is much lower than the amount of frost which would be deposited over a conventional evaporator fed with a single substance as working fluid.

Thus, for example, in the case where an air-stream, originating from a building where the relative humidity is 70% and a temperature of 20° C., and corresponding to 300 kg/h of dry air, is supplied onto an evaporator wherefrom it is discharged at 0° C., there is formed about 2.3 kg/h of frost in the case of a conventional evaporator.

On the contrary, when using an evaporator according to the invention, substantially no frost or at least only a very small amount of frost is formed.

Defrosting may be performed by different known techniques, for example, by heating with electric resistors or by cycle inversion. The control of the defrosting may be achieved, for example, by means of a frost detector or a generator of regularly spaced pulses, the defrosting being effective only when the evaporation pressure is lower than a given value.

In a preferred embodiment of the evaporator of the heat pump according to the invention, the mixture is circulated through tubes provided with fins or pins so as to increase the heat exchange on the air side. An example of an arrangement of these tubes is shown in FIG. 2.

The mixture making up the working fluid is supplied from the distributor D which distributes it between ducts 4, 5, 6, 7 and 8. Each of these ducts opens in a tube making up part of a tube battery, provided with fins. The mixture then circulates in parallel through the tubes arranged in batteries and so connected that, as a whole, the mixture flows counter-currently to the air stream in the direction and orientation indicated by the arrow 14 in FIG. 2.

The mixture supplied through duct 4 circulates through the upper duct forming part of the first battery, is discharged from said first battery through duct 9 which leads it to the upper tube of the second battery, wherefrom it is discharged through line 10 and fed to the upper tube of the third battery wherefrom it is discharged through line 11 and fed to the upper tube of the fourth battery, wherefrom it is discharged through line 12 which communicates with the main discharge duct 13 supplying the vapor mixture to the suction side of the compressor. The mixture fed through the other ducts 5, 6, 7 and 8 also flows as a whole in counter-current with the air stream, along parallel planes as shown in FIG. 2.

Other lay-out arrangements of the tubes according to different series/parallel modes may be contemplated, including or intermediate between the following:

(a) that shown in FIG. 2 wherein all the tubes are located in a single plane, and wherein the mixture circulates as a whole in counter-current with the gaseous stream, and are fed in parallel by the same number of feeding ducts issuing from the distributor D, and (b) the arrangement wherein all the tubes are connected in series. More specifically, the tubes may be located in m number of planes which will be considered as horizontal and n number of planes which will be considered as vertical with reference to the diagram of FIG. 2. Any other orientation obtained by any revolving motion in the space is possible; however, the preceding arrangement which corresponds to a circulation of air along a horizontal direction is preferred for the above-stated reasons.

When the water contained in the air which is supplied to the evaporator is condensed, it flows along the fins and is collected in a receiver.

It is possible in each vertical plane to connect the tubes in series by groups of p number of tubes, p being an integer from 1 to m, these groups of p tubes being fed through k number of feeding lines, k being a number such that $m = p \times k$. Each of the groups of p tubes of a vertical plane is connected to the group of p tubes of the next vertical plane according to an arrangement where the mixture as a whole circulates counter-currently to the air stream. Thus, the arrangements (a) and (b) correspond to particular cases of this general case, the arrangement (a) corresponding to $p = 1$, $k = m$ and the arrangement (b) corresponding to $p = m$, $k = 1$.

Another arrangement consists of making use of a tube provided with fins or pins and wound in a spiral whose base section is of any geometrical shape, the air stream being fed in the direction of the axis of the spiral in counter-current to the average direction of circulation of the fluid mixture. The diagram of FIG. 3 illustrates such an arrangement. In this diagram, the mixture is fed through line 15, circulates inside the tube 16 and is discharged through line 17. The arrows 18 and 19 indicate the direction of the air circulation, the air input being shown by arrow 18 and the output by arrow 19. Such a spiral may also be formed of several tubes arranged in parallel and wound about the same axis.

The spiral tube may be horizontally or vertically disposed, the horizontal position being preferred for the above-mentioned reasons. The condensed water flows by gravity, is collected and discharged.

The condenser of the heat pump provides heat to the external heating fluid which may be water or air. When the external fluid is water, it is possible to make use, for example, of a double tube exchanger wherein the mixture and the water of the heating circuit circulate counter-currently. When the external fluid is air, it is possible to make use of an exchanger complying with the general design shown on the diagram of FIG. 3.

Three main cases may be contemplated according to the nature of the air source:

(1) Recovery of heat from air withdrawn from a heated building

An example of a heat pump arrangement is shown in FIG. 4. The air is fed to evaporator E2 through casing G1 and is discharged by ventilator VE1.

The mixture of substances making up the working fluid is fed, in the liquid state, through line 19, circulates counter-currently to the air-stream and is discharged as vapor through line 20. The condensed water is collected in the receiver R1 and is discharged through line 19.

The vapor mixture is compressed in compressor K1 and is conveyed to condenser E3 through line 21. In this diagram, the external air is fed through line G2, circulates counter-currently to the mixture and is discharged by ventilator VE2 towards the building to be heated.

The condensed mixture is discharged from the condenser through line 22 and is expanded through the pressure reducer, i.e. expanding valve D1.

At mid-season, the heat pump may be operated only part of the time, as opposed to continuously with, the heating power obtained therewith being regulated by adjusting the relative periods of operation and stoppage. In this case, the mixture may act as a heat carrier enabling the recovery of the heat contained in the air withdrawn, i.e. exhausted, from a heated building by thermal exchange with the external air. This possibility is illustrated by the diagram of FIG. 4. When compressor K1 is stopped, the three-ways valves VD1, VD2, VD3 and VD4 cause the mixture to circulate by means of the circulator CI1 while by-passing the compressor K1 and the pressure reducer D1. This operation made possible by the fact that the temperature of the mixture may follow the temperature of the air with which the exchange is performed, in contrast to what happens when the working fluid is a pure substance.

The defrosting may be performed in this case by simple stoppage of the heat pump and/or of the mixture circulation. As a matter of fact, in such a case, the withdrawn air is no longer cooled and contacts the frost covered parts at a temperature close to 20 C.

The operating conditions of such a heat pump are described more in detail with the numerical data of the following example.

EXAMPLE 1

An air stream of 250 m3/h withdrawn from the building to be heated is conveyed to an evaporator by means of a ventilator VE1. This air is supplied at 20° C. and discharged from the evaporator at 4° C. The mixture has the following molar composition:
Trichloromonofluoromethane (R-11)=0.05
Monochlorodifluoromethane (R-22)=0.84
Monochlorotrifluoromethane (R-13)=0.11

The mixture reaches the evaporator E2 at a temperature of −5.8° C. and is discharged at a temperature of 10.4° C. Frosting appears only on the coldest part of the evaporator. Defrosting is performed by periodical stoppage of the mixture circulation and the water collected in receiver R1 is discharged through line 21.

The mixture reaches the condenser E3 at a temperature of 56.4° C. and is discharged at a temperature of 10.5° C. The external air is blown onto the condenser by means of a ventilator VE2. It is supplied at a temperature of 0° C. and is discharged at a temperature of 18.3° C. The mechanical power consumed by the compressor for compressing the mixture is 196 W.

By the use of mixtures, it is possible to obtain a heat pump whose performances are satisfactory, even when the discharge temperature is low. Accordingly, it is possible to increase the power of the heat pump and to reduce the supply of additional heat. However, this implies, when the condensed water is cooled below 0° C., to provide for a defrosting mechanism. The preferred defrosting mechanism consists, in this case, of stopping the mixture circulation, either periodically or in response to indications transmitted from a frost detector, by having the frost melted in contact with air withdrawn at a temperature close to its temperature when discharged from the heated building, i.e. about 20° C.

(2) Heat recovery from external air

FIG. 5 illustrates an example of an arrangement of a heat pump operated with a mixture of fluids wherein heat is taken from external air. In this example, the heating of the buildings is performed by a hot water circuit.

The external air is directed onto the evaporator E4 by means of the ventilator VE3, while passing through the casing G3. The mixture is fed to the evaporator through line 23, is discharged therefrom through line 24, is compressed by compressor K2, is conveyed through line 25, is condensed in condenser E5 and is fed to the pressure reducer D2 through line 26.

The water condensed on the evaporator is collected in the receiver R2 and discharged through line 29.

The water of the heating circuit is supplied through line 27, is heated by counter-current heat exchange with the mixture during its condensation and is discharged through line 28. The defrosting of the evaporator may be performed according to known techniques, as already mentioned: by electric resistor, cycle inversion, etc. In the case where the heating fluid is water, it is also possible to proceed periodically to a defrosting by means of a subsidiary circuit mounted on the heating circuit. In this case, the defrosting is achieved for example by circulating a small amount of water, taken at the highest possible temperature, through a tube of small section coupled with the fins of the one or more tubes wherethrough circulates the mixture. This tube may be simply contiguous or fixed, for example, by brazing or sticking. It is also possible to directly water the evaporator thereby heating the evaporator by direct contact during the defrosting period. This method may have the disadvantage of requiring a reintroduction of water in the heating circuit to avoid losses by evaporation. In order to obviate this difficulty, it is also possible to provide a reservoir of condensed water in the receiver R2 and to water the evaporator by means of a circuit of said water, previously heated by exchange with the water of the heating circuit.

During the defrosting period, the temperature of the heating circuit is maintained either by heating through an electric resistor or by combustion of a fuel such as for example, a liquid or gaseous hydrocarbon, associated with the heating by the heat pump, or by more thermal inertia of the heating circuit which preferably comprises in this case a hot water reservoir of sufficient size to maintain the temperature of the hot water of the heating circuit substantially constant during the stoppage period of the heat pump.

The arrangement of heat pump diagrammatically shown in FIG. 5 is given as an example and other arrangements may of course be contemplated. It is particularly possible to adapt a heat pump operated with a mixture of fluids and taking heat from external air, to a heating by hot air, the defrosting being performed according to different known techniques.

(3) Heat recovery from the air withdrawn from a building and from external air

Heat can also be recovered at the evaporator from a mixture of, i.e. exhaust, air and external air. In this case, the mixture of withdrawn air and external air may be formed before passing in contact with the evaporator. Another particularly advantageous arrangement is illustrated by the diagram shown in FIG. 6.

The mixture is fed through line 29 to a first part E6 of the evaporator onto which is conveyed a mixture of withdrawn air and external air, and the mixture is then transferred to a second portion E7 of the evaporator, operating at a higher temperature and wherein it exchanges heat with only the withdrawn air. The withdrawn air is admitted by opening the butterfly valves VO1, circulates through the casing G4 counter-currently with the mixture being vaporized, is admixed with external air, supplied through the casing G6 and which is admitted by opening the buterfly valves VO2, and the mixture of external air and withdrawn air is cooled down while circulating in counter-current with the mixture which vaporizes in evaporator E6.

The vapor mixture is discharged from evaporator E7 through line 30 and is admixed with the vaor supplied from duct 31. The so-formed vapor mixture is compressed in compressor K3 and fed, through line 33, to condenser E8 which also receives a mixture of external air with internal air. It is progressively condensed and the obtained liquid-vapor mixture is discharged through line 34 and fed to condenser E9 wherefrom it is discharged through line 35.

The external air is admitted by opening the butterfly valves VO3, circulates through casing G5 counter-currently with the mixture being condensed, is admixed with internal air supplied from casing G7 and which is admitted by opening the butterfly valves VO4, and the mixture of external air with internal air is heated by circulating in counter-current with the mixture being condensed in the condenser E8.

The liquid mixture is discharged from condenser E9 through line 35 and passes through exchanger E10 wherein it is precooled. It is discharged through line 36. A first fraction is then expanded through the pressure reducer D3 and vaporized through exchanger E10, in order to precool the mixture in exchanger E10. The vaporized fraction is discharged from exchanger E10 through line 31 and is admixed with the vapor issuing from evaporator E7 and supplied through line 30. The fraction of liquid mixture not expanded in the pressure reducer D3 is expanded in the pressure reducer D4 and the expanded mixture is fed through line 29 to evaporator E6.

The operation of such a heat pump can be more precisely understood from the numerical data of the following example.

EXAMPLE 2

The evaporator E7 is fed with an air stream of 250 m$^3$/h of air, withdrawn from a building to be heated. This air is supplied at 20° C. and discharged from the evaporator E7 at 10.2° C. It is then admixed with 500 m$^3$/h of external air supplied at 15° C. and the resultant air mixture is fed to evaporator E6 wherefrom it is discharged at 4° C.

The mixture has the following molar composition:
Trichloromonofluoromethane: 0.07
Monochlorodifluoromethane: 0.82
Monochlorotrifluoromethane: 0.11

This mixture is fed to evaporator E6 at a temperature of −8.1° C. and is discharged from the evaporator E6 at a temperature of 3° C. The vaporization is continued in evaporator E7 wherefrom the mixture is discharged at a temperature of 12.5° C.

The condensed water is recovered as it is formed and only a portion of the evaporator is subject to frosting.

The defrosting is performed by periodically interrupting the operation of the heat pump and by closing the butterfly valves VO2 of external air admission, whereby the frost is melted upon contact with the air withdrawn at a temperature close to the output temperature from the heated building, i.e. 20° C.

The mixture is compressed up to a pressure of 13 atmospheres and progressively condenses in condensers E8 and E9. Condenser E9 is fed with 250 m$^3$/h of external air. This external air is supplied at 15° C. and is discharged from condenser E9 at a temperature of 27.3° C. It is then admixed with 500 m$^3$/h of external air issued from the building to be heated, which is supplied at 20° C., and the resulting mixture is fed to condenser E8 wherefrom it is discharged at 34.2° C.

The condensed mixture is discharged from condenser E9 at a temperature of 26.7° C. It is sub-cooled in exchanger E10 down to a temperature of 1.9° C. A portion amounting to 15% of the total flow is expanded in a pressure reducer D3 and vaporized in exchanger E10 so as to produce the sub-cooling. The remaining fraction is expanded in pressure reducer D4 and fed through line 29 to evaporator E6.

The numerical data mentioned in this example are given merely for illustrating purposes and the operating conditions may be different. The proportions of withdrawn air and external air, as well as the proportions of external air and internal air, may vary to a large extent and many special cases may occur, particularly the case of an evaporator operated only with external air, or only with withdrawn air, or in the case of a condenser operated alternatively only with external air or only with internal air. The "internal" air is not materially different from the "withdrawn" air, the difference depending only on the final use of said air, i.e. on whether it is discharged outside (withdrawn or exhaust air) or fed back, after reheating, to the building to be heated (internal air).

Similarly, the condenser may be used to heat water as the heating fluid instead of air. This latter case may be of particular interest when the heat pump is operated in association with a boiler making use of a liquid, solid or gaseous fuel, this being the case in particular when the heat pump is adapted to house heating already including a conventional hot water heating system.

Three types of heat sources have been considered: withdrawn air, external air and a combinaton of withdrawn air with external air.

The use of a mixture is particularly advantageous when the heat is recovered from withdrawn air or from a combination withdrawn air and external air. As a matter of fact, it is in such a case that the variation of the air temperature, which acts a heat source, is the more substantial. In this case, the preferred defrosting mode consists of stopping the mixture circulation, although other defrosting methods can be used, for example by electric resistor or by cycle inversion.

As a general rule, the heat pump making use of a fluid mixture may be integrated into various heating systems comprising, in association with the heat pump, various other heating systems, for example an electric resistor or a boiler making use of a liquid, solid or gaseous fuel, or a solar collector, etc.

The mixtures may comprise two or three (or more) constituents (distinct chemical compounds). The constituents of the mixture may, for example, be halogenated hydrocarbons of the "Freon" type having one or two carbon atoms, such as trichlorofluoromethane (R-11), dichlorodifluoromethane (R-12), monochlorotrifluoromethane (R-13), monochlorodifluoromethane (R-22), 1,1,2-trichloro-1,2,2-trifluoro ethane (R-113), 1,2-dichloro,1,1,2,2-tetrafluoroethane (R-114), hydrocarbons such as propane or butane or still other organic fluids such as alcohols or esters. It is excluded to make use of an azeotrope alone since it does not provide for a change of state within a temperature range.

The operating conditions are generally selected so that the pressure of the mixture in the evaporator is higher than the atmospheric pressure and the pressure of the mixture in the condenser does not reach too high a value, for example higher than 30 bars. A single uniform pressure in the whole entire evaporation zone is recommended.

By way of illustration of the preferred operating conditions, the air may be introduced in the evaporation zone at a temperature from $-10°$ to $30°$ C. and discharged from said zone at a temperature at least $5°$ C. lower, and preferably ranging from $+10°$ to $-20°$ C. Similarly the fluid (for example air or water) to be heated may be admitted in the condensation zone at a temperature from $-10°$ to $+40°$ C. and may be discharged at a temperature at least $5°$ C. higher and, preferably ranging from $10°$ to $60°$ C.

It is advantageous, for operating the process according to the invention, to proceed to the heat exchange at the evaporator according to an exchange mode combining the cross-current and counter-current circulation. Thus, it is possible to take advantage of the use of a non-azeotropic mixture improving the performance coefficient, while limiting the air pressure drop and reducing the bulk. This can be achieved, for example, by serially arranged batteries, each of which is placed perpendicularly to the air-stream and wherethrough, as a whole, the mixture is circulated in counter-current with the air-stream, or still by circulating the mixture in a series of spirals in counter-current with the air-stream, each of the spirals being placed in a plane substantially perpendicular to the air direction. It is important in this case to avoid any heat transfer by conduction between the spirals or batteries.

What is claimed is:

1. In a process for producing heat by means of a heat pump comprising the steps of (a) vaporizing a working fluid, in an evaporation zone, in counter-current thermal exchange contact with a first fluid used as a heat source, under a first pressure level, said working fluid consisting essentially of a non-azeotropic mixture of at least two distinct components, (b) compressing the resultant vaporized working fluid, (c) condensing the resultant compressed vaporized working fluid, in a condensation zone, in counter-current thermal exchange contact with a second fluid for heating said second fluid, under a second pressure level higher than the first pressure level, and (d) expanding the condensed working fluid from step (c) and recirculating it to step (a), the improvement comprising:

conducting said vaporization of the working fluid in counter-current thermal exchange contact with a first fluid comprising relatively cool moist air by passing the working fluid through an evaporator zone with the cool moist air being passed successively through a first section of the evaporator zone which is nearest the point of entry of the relatively cool moist air into the evaporator zone, and a second section of the evaporator zone which is nearest the point of exit of the relatively cool moist air, thereby causing water to be condensed and deposited on the surfaces of the first section of the evaporator zone and frost to form on the surfaces of the second section of the evaporator zone; and discharging the deposited water from the first section immediately upon condensation thereof to prevent said condensed water from contacting the surfaces of the second section, thereby reducing the amount of frost formed on the surfaces of the second section.

2. A process according to claim 1, further comprising passing the working fluid through the evaporator zone in a horizontal direction whereby the water is discharged vertically downwardly by gravity, as it is condensed.

3. A process according to claim 1, further comprising periodically interrupting the operation of the heat pump and defrosting the frosted second zone by passing air withdrawn from a building heated with the heated second fluid over the surfaces of the frosted first zone.

4. A process according to claim 1, further comprising periodically interrupting the operation of the heat pump and defrosting the frosted second zone by passing a heat receiving fluid over the surfaces thereof.

5. A process according to claim 1, wherein the first fluid used as a heat source comprises a fluid (A) and a fluid (B), and the vaporizing of the working fluid mixture in the evaporator zone comprising first contacting the working fluid mixture in counter-current contact with fluid (B) and then with fluid (A), fluid (B) being air withdrawn from a relatively warm building, and fluid (A) being a mixture of external air and fluid (B) after fluid (B) has been subjected to said heat exchange contact with the working fluid mixture.

6. A process according to claim 5, wherein said second fluid heated in said condensation zone comprises a fluid (A') and another fluid (B'), said condensing of resultant compressed vaporized working fluid in the condensation zone comprising first contacting said one fluid (A') counter-currently with said working fluid mixture, and then contacting said working fluid mixture counter-currently with the another fluid (B'), fluid (A') being relatively cold external air, and fluid (B') being a mixture of air withdrawn from a relatively warm building and fluid (A') after fluid (A') has been subjected to said counter-current heat exchange with the working fluid mixture.

7. A process according to claim 1, wherein said first fluid is introduced into the evaporation zone at a temperature of from $-10°$ to $30°$ C., and is discharged from said zone at a temperature at least $5°$ C. lower.

8. A process according to claim 7, wherein said first fluid is discharged from said zone at a temperature of $+10°$ to $-20°$ C.

9. A process according to claim 1, further comprising heating the discharged condensation water and periodically defrosting the first section of the evaporation zone with said heated condensation water by applying said heated condensation water thereto.

10. A process according to claim 9, further comprising subjecting the working fluid, after passage through the condensation zone, to a pre-cooling stage by heat exchange with at least a portion of the working fluid mixture issued from the expansion zone, said portion issued from the expansion zone being subsequently fed directly to the compression zone without being passed through the evaporation zone.

11. A process according to claim 1, wherein the evaporator zone is arranged so that the counter-current contacting of the first fluid and the working fluids is conducted by means of a combination of cross-current and counter-current flows between said first fluid and the working fluid.

12. A process according to claim 1, wherein the evaporator zone comprises several separate non-contiguous batteries of tubes, the tubes of each battery arranged along parallel planes which are perpendicular to the direction of the first fluid flow comprising the heat source, and the working fluid mixture of fluids being passed through said batteries in series so that said working fluid mixture circulates in a generally counter-current direction with respect to the first fluid.

13. A process according to claim 1, characterized in that the evaporator zone comprises at least one tube, provided with fins, and wound in a spiral along a horizontal axis, and wherein the working fluid mixture is circulated in counter-current with the first fluid comprising the heat source, said working fluid mixture being introduced into the at least one tube at the outlet of the first fluid in the evaorator zone and discharged from the at least one tube at the inlet of the first fluid in the evaporator zone.

* * * * *